(12) United States Patent
Tritschler et al.

(10) Patent No.: US 11,951,779 B2
(45) Date of Patent: Apr. 9, 2024

(54) SYSTEM FOR TRANSMITTING CONTROL PRESSURES AND/OR WORKING PRESSURES

(71) Applicants: ILLINOIS TOOL WORKS INC., Glenview, IL (US); KT PROJEKTENTWICKLUNGS GMBH, Untergruppenbach (DE)

(72) Inventors: Eva Tritschler, Bodman-Ludwigshafen (DE); Christiane Schwarz, Pfullendorf (DE); Roland Braun, Herdwangen-Schonach (DE); Henry Klemm, Überlingen (DE); Martin Spindler, Herdwangen-Schonach (DE); Bruno Schulze Selting, Rielasingen-Worblingen (DE)

(73) Assignee: Illinois Tool Works Inc., Glenview, IL (US)

( * ) Notice: Subject to any disclaimer, the term of this patent is extended or adjusted under 35 U.S.C. 154(b) by 681 days.

(21) Appl. No.: 16/961,343

(22) PCT Filed: Jan. 17, 2019

(86) PCT No.: PCT/US2019/014007
§ 371 (c)(1),
(2) Date: Jul. 10, 2020

(87) PCT Pub. No.: WO2019/143814
PCT Pub. Date: Jul. 25, 2019

(65) Prior Publication Data
US 2020/0346499 A1 Nov. 5, 2020

(30) Foreign Application Priority Data
Jan. 17, 2018 (DE) ..................... 10 2018 100 955.0

(51) Int. Cl.
*B60C 23/00* (2006.01)
*B60B 27/00* (2006.01)

(52) U.S. Cl.
CPC .... *B60C 23/00318* (2020.05); *B60B 27/0047* (2013.01); *B60C 23/002* (2013.01)

(58) Field of Classification Search
CPC ............ B60C 23/00318; B60C 23/002; B60B 27/0047
See application file for complete search history.

(56) References Cited

U.S. PATENT DOCUMENTS 2,218,143 A 10/1940 Birchfield
10,696,106 B2 * 6/2020 Hennig ............. B60C 23/00345
(Continued)

FOREIGN PATENT DOCUMENTS

CA 2 343 385 A1 3/2000
CN 103079843 A 5/2013
(Continued)

OTHER PUBLICATIONS

European Patent Office (EPO), Rijswijk, NL, Int'l Search Report, Form PCT/ISA/210 for Int'l Application No. PCT/EP2018/014007, dated Dec. 4, 2019 (2 pages).
(Continued)

*Primary Examiner* — Scott A Browne
(74) *Attorney, Agent, or Firm* — McAndrews, Held & Malloy, Ltd.

(57) ABSTRACT

A system (40) for transmitting control pressures and/or working pressures from a wheel-hub pressure medium supply (20, 21, 22), in particular from a wheel-hub pressure medium rotary union (21), to a vehicle rim (2) mounted on the wheel hub (1). The system (40) has a receiving part (41), which has a central region (55) with a central opening (44) and at least one extension region (43) projecting radially
(Continued)

from the central region (55), at least in some regions. The receiving part (41) can be connected to the wheel hub (1) by means of the at least one radially projecting extension region (43), in a detachable way, and the control pressures and/or working pressures can be transmitted from the wheel-hub pressure medium supply (20, 21, 22) to the opening (44).

20 Claims, 6 Drawing Sheets

(56) References Cited

U.S. PATENT DOCUMENTS

| | | | |
|---|---|---|---|
| 2005/0205182 A1* | 9/2005 | Maquaire | B60C 23/00354 |
| | | | 152/417 |
| 2009/0084481 A1 | 4/2009 | Kalavitz | |
| 2009/0311112 A1 | 12/2009 | Isono | |
| 2010/0038004 A1 | 2/2010 | Saadat | |
| 2010/0065177 A1 | 3/2010 | Saadat | |
| 2015/0360522 A1* | 12/2015 | Dieckmann | B60C 23/00354 |
| | | | 152/417 |
| 2016/0347131 A1 | 12/2016 | Tsiberidis | |
| 2016/0361957 A1 | 12/2016 | Burke et al. | |

FOREIGN PATENT DOCUMENTS

| | | |
|---|---|---|
| DE | 101 32 429 A1 | 2/2002 |
| DE | 10332792 | 1/2004 |
| DE | 10 2014 001373 A1 | 8/2015 |
| DE | 10 2014 219983 A1 | 4/2016 |
| JP | 2007-176356 A | 7/2007 |
| JP | 2018-528900 A | 10/2018 |
| WO | WO2017/077304 | 5/2017 |

OTHER PUBLICATIONS

Japanese Patent Office, Kasumigaseki, Chiyoda, Tokyo, English language version of the Office Action for Japanese Application No. 2020-560876, dated Sep. 21, 2022 (9 pgs).

Germany Patent Office, Munich, Germany, German language version of the Office Action for German Application No. 10 2018 100 955.0, dated Apr. 17, 2023 (7 pages).

* cited by examiner

SYSTEM FOR TRANSMITTING CONTROL PRESSURES AND/OR WORKING PRESSURES

BACKGROUND OF THE INVENTION

Field of the Invention

The present invention relates to a system for transmitting control pressures and/or working pressures particularly in a wheel unit with a rotatably supported vehicle tire. According to exemplary embodiments of the invention, this particularly relates to a system for transmitting control pressures and/or working pressures from a compressed air rotary union or a wheel hub of a wheel unit to a vehicle rim mounted on the wheel hub or to a vehicle wheel mounted on the wheel hub.

The invention also relates to a wheel unit with such a system for transmitting control pressures and/or working pressures and to a distributed system for supplying pressure medium, which has a plurality of wheel units, each with a corresponding system for transmitting control pressures and/or working pressures.

Discussion of Related Art

Vehicle tires are usually filled with compressed air. It is also conceivable to fill them with other pressurized mediums such as nitrogen. For purposes of the present disclosure, vehicle tires can, for example, be tube-type tires or tubeless tires. Vehicle tires are used, for example, in passenger cars, busses, and commercial vehicles, but also for example in aircraft.

Conventional vehicle tires are usually supplied with a pressure medium, i.e. compressed air or a nitrogen filling, by means of external connections. Usually, standardized valves are used for this. Vehicle tires usually have an optimum operating pressure or inflation pressure, which depends on the respective usage conditions or operating conditions. Thus for land vehicles such as passenger cars, busses, and commercial vehicles, there are operating pressures or pressure ranges that can insure an optimum of rolling resistance, lateral guidance, longitudinal guidance, heat build-up, and/or wear behavior.

An existing actual pressure in a tire can, within certain limits, fluctuate for example with the ambient temperature or operating temperature. Furthermore, over the long term, a certain pressure loss, for example a so-called gradual pressure loss, often cannot be entirely avoided. There are known systems for vehicles that make it possible to monitor the operating pressure or inflation pressure in tires. These can be so-called active or passive systems. Passive systems can be set up, for example, to determine the rolling circumferences of the tires of an axle and compare them to one another. If this reveals significant differences, then this is an indication that there are differences in the pressures in the respective tires. Active systems for compressed air measurement and/or compressed air monitoring usually include pressure measuring sensors that are integrated into a wheel unit. Pressure sensors of this kind can be equipped, for example, to transmit corresponding pressure signals wirelessly or by wire from the (rotating) tire to stationary components of the vehicle.

Basically, other systems have also become known that permit an autonomous adjustment of the inflation pressure of vehicle tires. Such systems can be found, for example, in off-road vehicles, military vehicles, or similar special-purpose vehicles. The systems can basically be designed to permit adjustment of the inflation pressure while the vehicle is at rest, i.e. when the vehicle is not moving.

Known systems for autonomous pressure regulation in vehicles have a central structure. In other words, there is only one device for supplying the pressure medium for inflating the tires. It is also conceivable to provide a few devices for supplying the pressure medium, for example in a combination of a tractor and a trailer or semitrailer. Such a central supply device for compressed air must nevertheless be provided in order to inflate a plurality of wheel units, in particular for different axles. For this purpose, the central supply unit for compressed air or pressure medium must be coupled to a plurality of wheel units. In other words, the supply unit is usually mounted on the frame, body, or coachwork of the vehicle. The supply unit can, for example, include a compressor or air compressor. It is then necessary to route a plurality of or multiple compressed air lines or pressure medium lines from the supply unit to the individual wheel units. This usually requires provision of a plurality of so-called rotary unions for the pressure medium lines. This is dictated by the fact that the tires of the wheel units are usually mounted in rotary fashion on the axles of the vehicle.

Basically, the transmission of corresponding control pressures and/or working pressures from the wheel hub to a vehicle rim mounted on the wheel hub or to a vehicle wheel mounted on the wheel hub is relatively costly and complex because a wheel unit and its suspension are usually comprised of the wheel bearing, the wheel hub with the wheel-mounting flange, a brake disc with the brake-disc chamber, and the vehicle rim with the tire. The vehicle rim is mounted to the wheel-mounting flange with wheel lug bolts, with the brake disc being clamped between the vehicle rim and the wheel-mounting flange by means of the brake-disc chamber. Such a wheel bearing assembly is known, for example, from the reference DE 101 32 429 A1.

The problem when transmitting control pressures and/or working pressures from the wheel hub to a vehicle rim that is mounted on the wheel hub lies particularly in the fact that, regardless of whether the pressure medium is supplied centrally or in a decentralized way, as a rule, control pressures and/or working pressures must be conveyed through the brake-disc chamber between the vehicle rim and the wheel-mounting flange.

SUMMARY OF THE INVENTION

Consequently, the object of the invention, among other things, is to disclose a system for transmitting control pressures and/or working pressures from a compressed air union or wheel hub to a vehicle rim mounted on the wheel hub or to a vehicle wheel mounted on the wheel hub; with this system, the pressure transmission can be implemented without structural changes, or at least without significant ones, to the brake-disc chamber or brake disc.

The object underlying the invention is attained according to the invention by the subject of the independent claim 1; advantageous modifications of the transmission system are disclosed in the dependent claims.

The solution according to the invention, therefore, relates in particular to a system for transmitting control pressures and/or working pressures from a wheel-hub pressure medium supply, for example a pressure medium rotary union in or on a wheel hub, to a vehicle rim mounted on the wheel hub or to a vehicle wheel mounted on the wheel hub. The system has a receiving part, which is embodied, when in use, to be positioned around the wheel hub and/or the brake-disc chamber or alternatively to this, to be permanently connected to the wheel hub and/or the brake-disc chamber.

According to exemplary embodiments of the solution according to the invention, the receiving part has a preferably rotationally symmetrical central region with an opening. In addition, the receiving part has at least one extension region projecting radially, at least in some regions, from the central region. By way of this at least one extension region projecting radially from the central region, the receiving part can be connected to the wheel hub, preferably in a detachable way. In addition, control pressures and/or working pressures can be transmitted from a wheel-hub pressure medium supply, such as a compressed air rotary union or the like, to the opening in the central region.

In this context, it is suitable if the at least one extension region projecting radially from the central region is embodied to engage in the fastening bores for the vehicle rim that are usually provided in the brake-disc chamber and thus for it to have the ability to be connected to the wheel hub.

According to preferred embodiments of the solution according to the invention, the opening of the central region is embodied, at least some regions, to receive a rim insert arranged in the central bore of a vehicle rim.

In this connection, it is particularly conceivable for the system according to the invention not only to have the above-mentioned receiving part with the central region and the at least one extension region, but also to have a wheel/rim insert, which can be accommodated, at least in some regions, by the opening of the central region. Preferably, the wheel/rim insert has a configuration that is adapted to the central bore of a vehicle rim in such a way that the wheel/rim insert can be accommodated, at least in some regions, in the central bore of the vehicle rim.

In order to achieve the fact that a vehicle rim or a vehicle wheel can be mounted to the system according to the invention in any position, in particular regardless of the actual embodiment of the wheel-hub pressure medium supply or of a compressed air rotary union, according to advantageous implementations of the system according to the invention, the opening of the central region and the wheel/rim insert that is accommodated, at least in some regions, by the opening together form a rotary union for transmitting control pressures and/or working pressures from the wheel-hub pressure medium supply to the rim insert that is accommodated, at least in some regions, by the opening.

The term "rotary union" used herein is understood to be a connection that makes it possible for control pressures and/or working pressures to be transmitted regardless of a rotational position of the wheel/rim insert relative to the opening.

In this connection, it is particularly conceivable, in order to embody the rotary union, for the wheel/rim insert, at least in some regions, to be rotationally symmetrical and in particular circular-cylindrical or frustoconical and for it to have an outer circumferential surface; in the outer circumferential surface, at least one annular groove, preferably running all the way around, is formed, which is embodied in such a way that when the wheel/rim insert is accommodated, at least in some regions, by the opening of the central region, control pressures and/or working pressures can be transmitted from the wheel-hub pressure medium supply to the at least one annular groove by way of the at least one radially projecting extension region.

Alternatively or in addition to this, it is conceivable for the opening, at least in some regions, to be rotationally symmetrical and in particular circular-cylindrical and/or frustoconical and for it to have an inner circumferential surface and in the inner circumferential surface, at least one annular region, preferably running all the way around, for an annular groove to be formed, which is embodied in such a way that control pressures and/or working pressures can be transmitted from the wheel-hub pressure medium supply to the annular groove by way of the at least one radially projecting extension region.

According to embodiments of the system according to the invention, the wheel/rim insert has at least one pressure sensor that is in or can be brought into fluid connection with a tire mounted on the vehicle rim. Alternatively or in addition to this, it is conceivable for the wheel/rim insert to have at least one pressure-controlled outlet valve, which on the one hand is in or can be brought into fluid connection with a tire mounted on the vehicle rim and on the other hand is in or can be brought into fluid connection with the wheel-hub pressure medium supply by way of the at least one annular region. It is also conceivable for the wheel/rim insert to have at least one refill valve that is in or can be brought into fluid connection with a tire mounted on the vehicle rim. Naturally other functions can be implemented in the wheel/rim insert.

With regard to the at least one radially projecting extension region, it is advantageous if in this extension region, a pressure medium channel is formed, having a first end region, which is in fluid connection with a pressure medium connection of the extension region, and a second end region, which opens out into the at least one annular groove. The pressure medium connection of the at least one extension region can, for example, be embodied as a plug-in connection and is designed to have the ability to be accommodated in a connection that is correspondingly embodied to be complementary to it and this connection, preferably extends through a brake-disc chamber that is positioned, at least in some regions, between the wheel hub and the vehicle rim and opens out into a line system that is in or can be brought into fluid connection with the wheel-hub pressure medium supply. In this context, it is conceivable, for example, for the connection for accommodating the pressure medium connection of the at least one extension region to be embodied in or by means of a fastening bore of the brake-disc chamber for the vehicle rim.

In an advantageous way, the system according to the invention is designed as a component of a tire pressure control system and is embodied to transmit separate control pressures and/or working pressures from the wheel-hub pressure medium supply to the vehicle rim or vehicle wheel. In particular, the system is embodied to detect a tire pressure and/or a tire temperature and to transmit the detected value or detected values to a corresponding control unit. It is also advantageous if the system is embodied to inflate or deflate, as needed, a tire that is mounted on the vehicle rim or the vehicle wheel.

According to an exemplary embodiment of the receiving part, this part has multiple extension regions, which project radially from the central region, these extension regions being positioned equidistantly from one another. In particular, the placement of the extension regions is structurally adapted to a bolt circle of the vehicle rim or to a bolt circle (fastening bores) of the brake-disc chamber.

According to a modification of this embodiment, the receiving part is embodied as a module and can be accommodated in a flush manner in the region of a center hole (central bore) of the vehicle rim and the wheel/rim insert can be inserted into the center hole (central bore) of the vehicle rim.

According to another exemplary embodiment, the wheel/rim insert has an external refill valve that is in or can be brought into fluid connection with at least one annular groove between the central region and the wheel/rim insert.

According to another exemplary embodiment, the vehicle rim is associated with a pressure medium path, which, at least in some regions, is advantageously embodied as an integral component of the rim, in particular as a channel in an arm of the rim. For example, the pressure medium path, at least in some regions, extends radially along an arm of the rim and in the region of a shoulder or a bed of the rim, a seat for an internal filling valve adjoins the pressure medium path. According to exemplary embodiments, the wheel/rim insert has a pressure sensor and the pressure sensor can be connected via a signal line to a control unit of a pressure medium supply device in order to transmit a pressure signal to the pressure medium supply device. The pressure sensor can be embodied as a combined pressure/temperature sensor.

The disclosure also relates to a pressure medium supply system for a vehicle, in particular a multitrack vehicle, with at least two vehicle wheels that are each provided with a system for transmitting control pressures and/or working pressures.

It goes without saying that the features mentioned above and those that have yet to be explained below can be used not only in the respectively indicated combination, but also in other combinations or by themselves without going beyond the scope of the present invention.

Other features and advantages of the invention ensue from the following description of an exemplary embodiment with reference to the accompanying drawings.

DETAILED DESCRIPTION OF THE INVENTION

Figure 1:
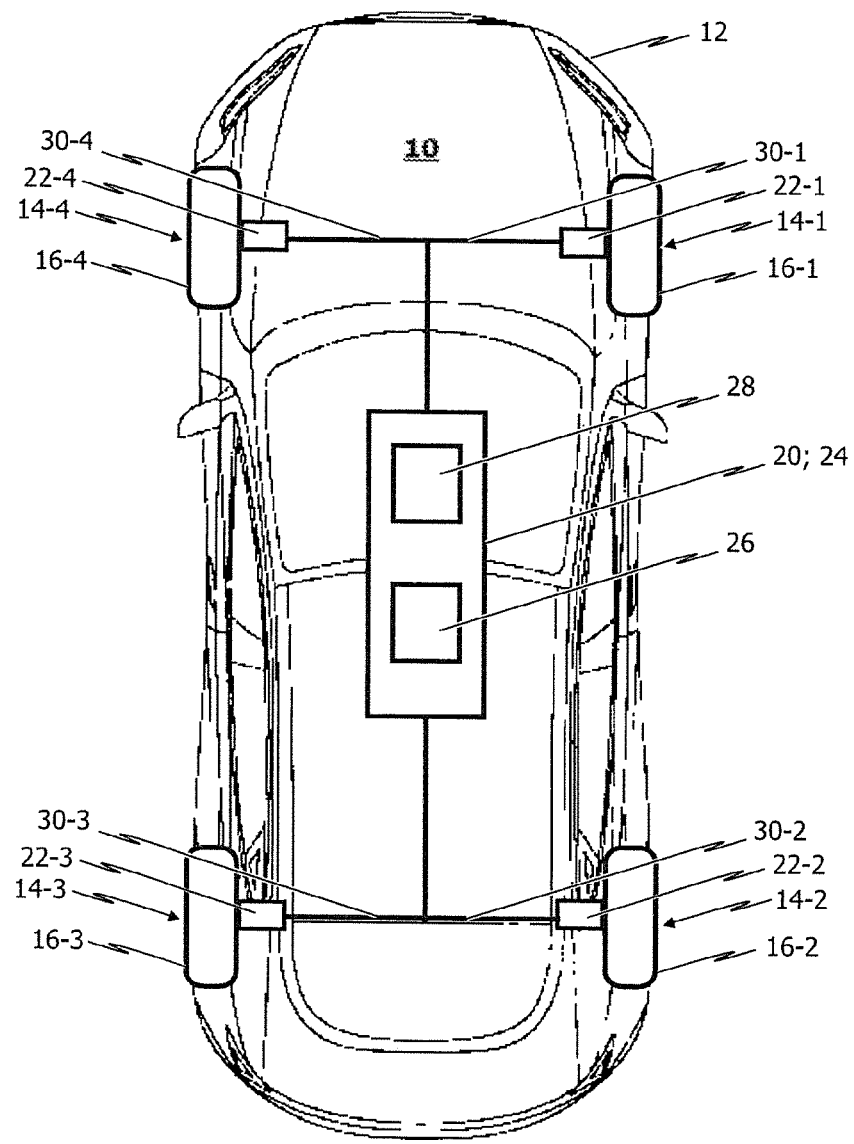
FIG. 1 is a schematic, very simplified top view of a vehicle that is equipped with a central pressure medium supply system.

FIG. 1 is a schematic, very simplified top view of a vehicle 10, which is depicted by way of example as a passenger car. Naturally, the vehicle 10 can alternatively also be embodied as a commercial vehicle and in general, as a land vehicle. The present disclosure is not limited to land vehicles. For example, it is conceivable for it to be used in aircraft (airplanes) that have landing gear.

A chassis or body of the vehicle 10 is labeled with the reference numeral 12.

The vehicle 10 has multiple axles 14-1, 14-2, which are offset from each other in a longitudinal direction of the vehicle. The vehicle 10 shown in FIG. 1 is a two-axle vehicle. Naturally, the scope of the disclosure extends to multi-axle vehicles (trucks that are embodied with three or four axles), but it also includes single-axle vehicles (such as trailers, semitrailers, or the like).

It goes without saying that the vehicle 10 can generally be embodied as a driven vehicle. But the vehicle 10 can also be a vehicle that is pushed or pulled, in particular a trailer, semitrailer, or the like. The vehicle 10 shown in FIG. 1 is embodied as a multitrack vehicle, in particular a two-track vehicle. The present disclosure, however, can also relate to single-track vehicles (motorcycles, mopeds, or the like).

The vehicle 10 has four vehicle wheels 16, with two being associated with each of the axles 14-1, 14-2. The vehicle wheels are labeled in clockwise sequence with the reference numerals 16-1, 16-2, 16-3, and 16-4.

The vehicle 10 has an integrated (on-board) pressure medium supply system 20. The pressure medium supply system 20 is only depicted schematically in FIG. 1 by means of a block diagram. The pressure medium supply system 20 includes multiple distributed (outlying) pressure medium supply devices 22. In particular, each vehicle wheel 16 (or each pair of wheels) is associated with a pressure medium supply device 22. The first wheel 16-1 is associated with a first pressure medium supply device 22-1. The second wheel 16-2 is associated with a second pressure medium supply device 22-2. The third wheel 16-3 is associated with a third pressure medium supply device 22-3. The fourth wheel 16-4 is associated with a fourth pressure medium supply device 22-4.

According to one aspect of the present disclosure, the production of pressure in the pressure medium supply system 20 takes place in either a decentralized or centralized way.

The vehicle wheels 16 usually have tires that can be filled with a pressure medium. Normally, tires are filled with air. It is also conceivable, though, to fill the tires with nitrogen or the like. With the decentralized pressure production of the pressure medium supply system 20, in order to check, regulate, and adjust the level of pressure medium in the tires of the vehicle wheels 16, each of the pressure medium supply devices 22 is provided with its own unit for supplying the pressure medium. It would also be conceivable, though, to provide a central pressure medium supply in which a central compressor or compressed air reservoir is required. This would require corresponding pressure medium rotary unions for a transmission from the chassis 12 to the vehicle wheels 16.

In any case, the pressure medium supply system 20 can be indirectly or directly coupled to the pressure medium supply devices 22. This can also take place primarily for purposes of transmitting electrical energy, for exchanging data, and for control purposes.

For example, the pressure medium supply system 20 includes a control unit 24, which includes a signal processing unit 26 and an energy storage unit 28 or is coupled thereto. The control unit 24 can, for example, be coupled to a main energy storage unit (main battery) of the vehicle 10. Alternatively, it is conceivable for separate energy storage units 28 to be provided in the control unit 24 and for them to be coupled to the control unit 24.

The signal processing unit 26 can be embodied as part of an overarching vehicle control system. Alternatively, the signal processing unit 26 can be embodied as a separate module. The control unit 24 is embodied to monitor a state of the vehicle wheels 16, in particular of their tires, in order to be able to detect a need for pressure medium. This can take place, for example, by means of a direct or indirect tire pressure monitoring in the wheels 16. Consequently, the control unit 24 can be embodied to control one or more pressure medium supply device(s) 22 in order to achieve a desired pressure in the tires of the wheels 16.

Alternatively or in addition, the pressure medium supply devices 22 can also be embodied to autonomously maintain a particular target state or target range with regard to the pressure in the tires of the vehicle wheel 16. In this operating state, no external control commands would be required. Hybrid forms are also conceivable, in which on the one hand, central control signals are generated for the pressure regulation and on the other hand, an at least partially decentralized autonomous regulation is enabled, for example as part of an emergency operation.

According to the example shown in FIG. 1, the control unit 24 is or can be coupled via electrical lines 30 to the pressure medium supply devices 22 associated with the vehicle wheels 16. The lines 30 are embodied as electrical lines. The lines 30 are particularly embodied to transmit energy to the pressure medium supply devices 22. Alternatively or in addition, the lines 30 can also be embodied to transmit data, signals, measurement values, parameters, or the like. It goes without saying that it is also possible for multiple lines 30 to be embodied for purposes of energy transmission and data transmission. According to the depiction in FIG. 1, the control unit 24 is or can be connected via a first line 30-1 to a first pressure medium supply device 22-1, via a second line 30-2 to a second pressure medium supply device 22-2, via a third line 30-3 to a third pressure medium supply device 22-3, and via a fourth line 30-4 to a fourth pressure medium supply device 22-4.

The pressure medium supply system 20 is embodied to perform adjustments to the pressure or air pressure in the tires of the wheels 16 during the operation of the vehicle 10. It is therefore unnecessary to slow down or stop the vehicle 10 in order to perform adjustments to the pressure in the tires. Instead, the pressure medium supply device 22 is embodied to be able to perform adjustments to the pressure even during a relative rotation between the vehicle wheels 16 and the axles 14 of the vehicle.

Preferably, the control unit 24 of the pressure medium supply system 20 is embodied to detect pressure losses and the detection also includes a detection of tire damage. For this purpose, a defined pressure drop over a certain period of time can be used as a threshold indicating the existence of a flat tire or tire damage.

In addition, the pressure medium supply system 20 is embodied to monitor a pressure in the tires of the wheels 16 over the long term. In this way, it is also possible, for example, to detect and compensate for seasonal (temperature-induced) pressure fluctuations and a natural long-term pressure drop in the wheels 16. Another use for the pressure medium supply system 20 can turn out to be a selective adjustment of the pressure in the wheels 16. It is thus possible, for example, to react to different load states, axial loads, road conditions, weather conditions, or the like.

An exemplary embodiment of a system 40 for transmitting control pressures and/or working pressures from a compressed air rotary union 21 or a wheel hub 1 to a vehicle rim 2 mounted on the wheel hub 1 or a vehicle wheel mounted on the wheel hub 1, which system can, for example, be used with the pressure medium supply system 20 according to FIG. 1, will be described in detail below.

Figure 2:
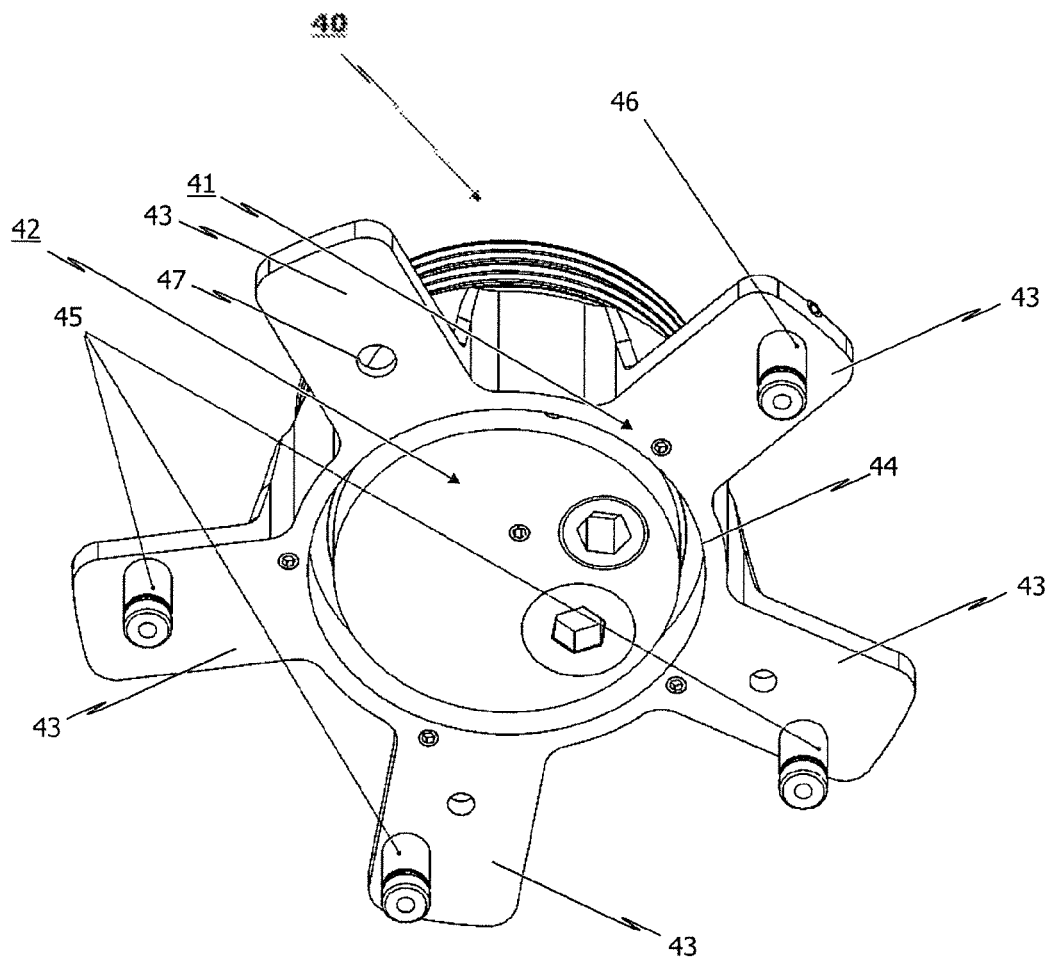
FIG. 2 is a schematic, isometric view of an exemplary embodiment of the system according to the invention for transmitting control pressures and/or working pressures, having a wheel/rim insert, which, at least in some regions, is accommodated in an opening of a central region of a receiving part of the system.
Figure 3:
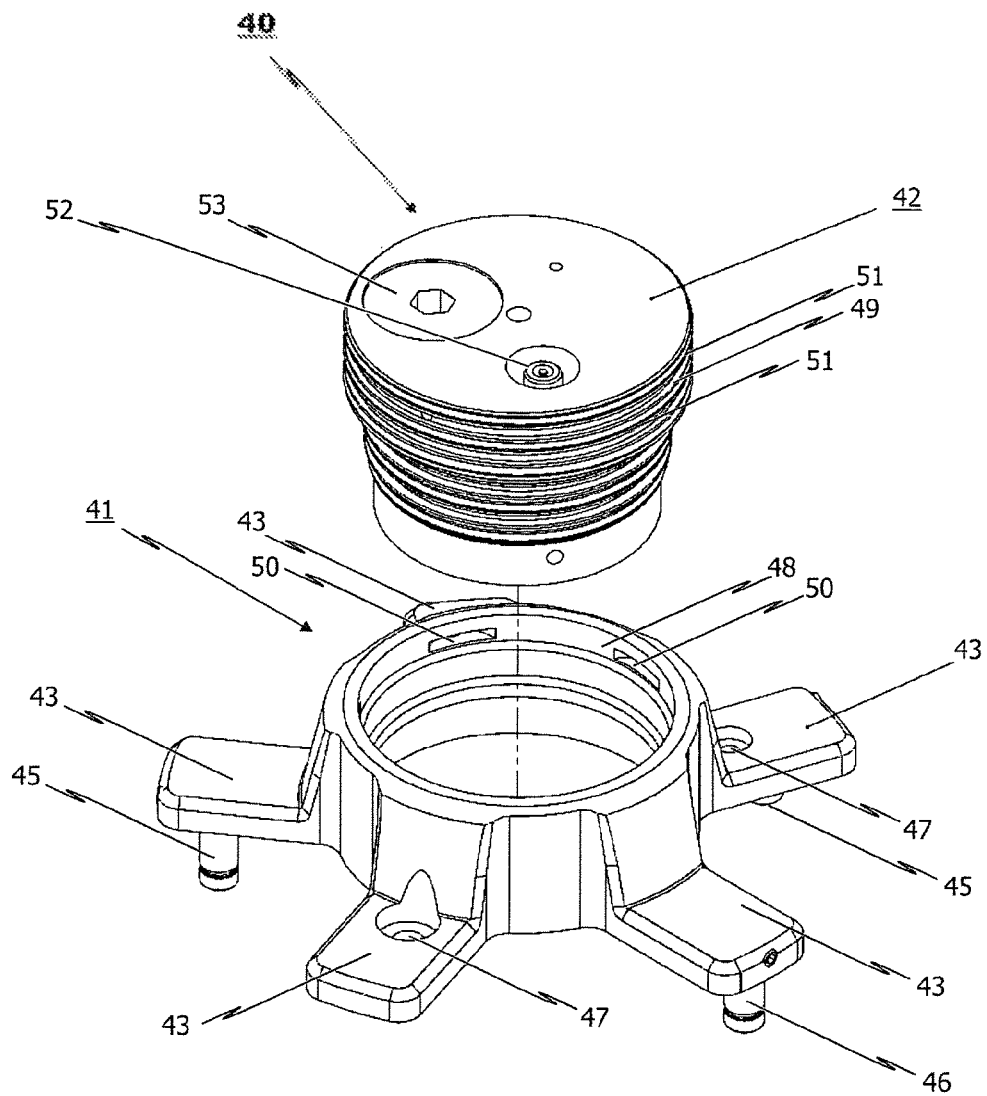
FIG. 3 is a schematic, isometric view of the exemplary embodiment of the system according to the invention from FIG. 2, in a partially exploded view.
Figure 4:
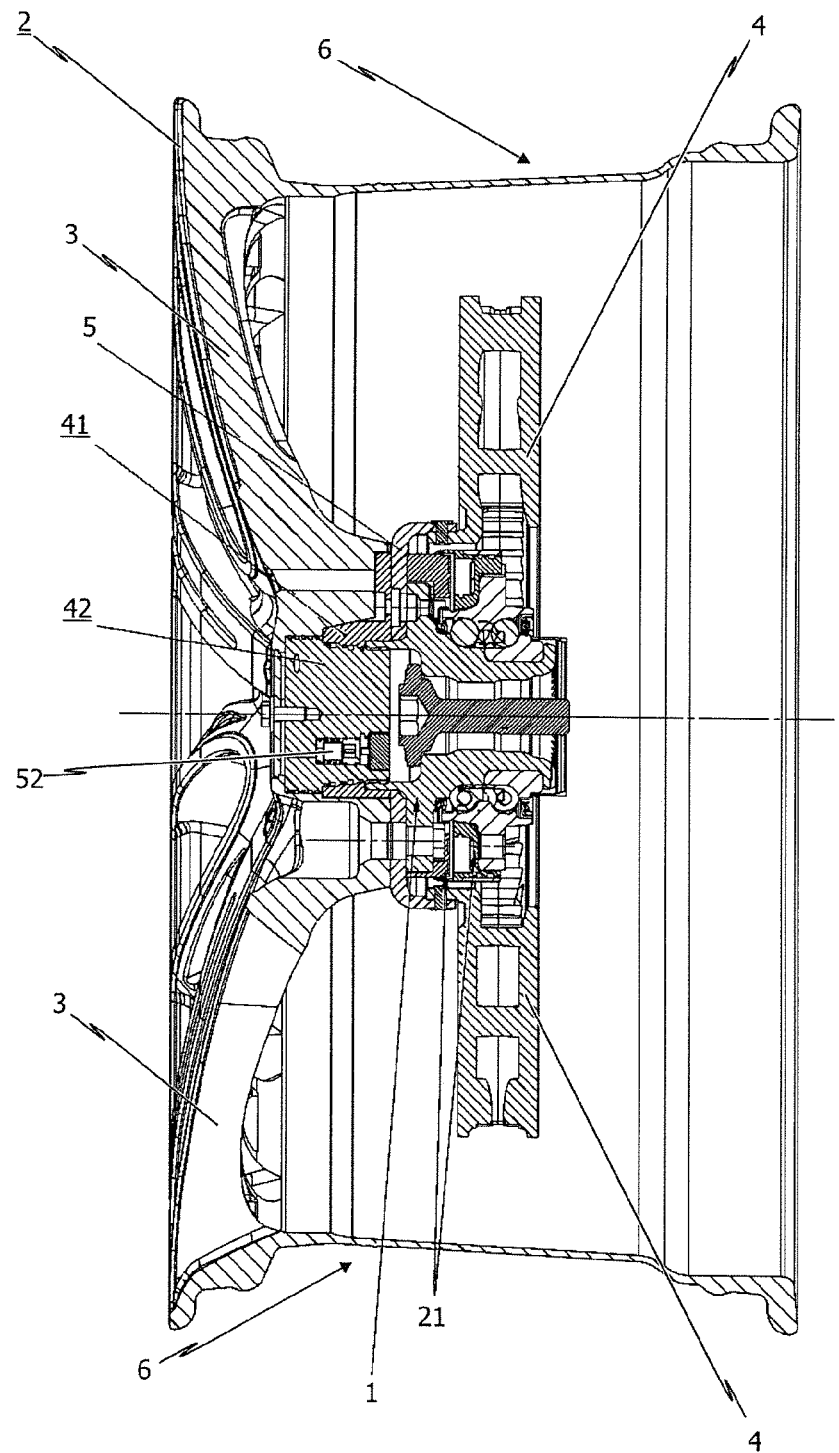
FIG. 4 is a schematic, longitudinal section through a wheel unit with the exemplary embodiment of the transmission system according to the invention shown in FIG. 2 in the assembled state.
Figure 5:
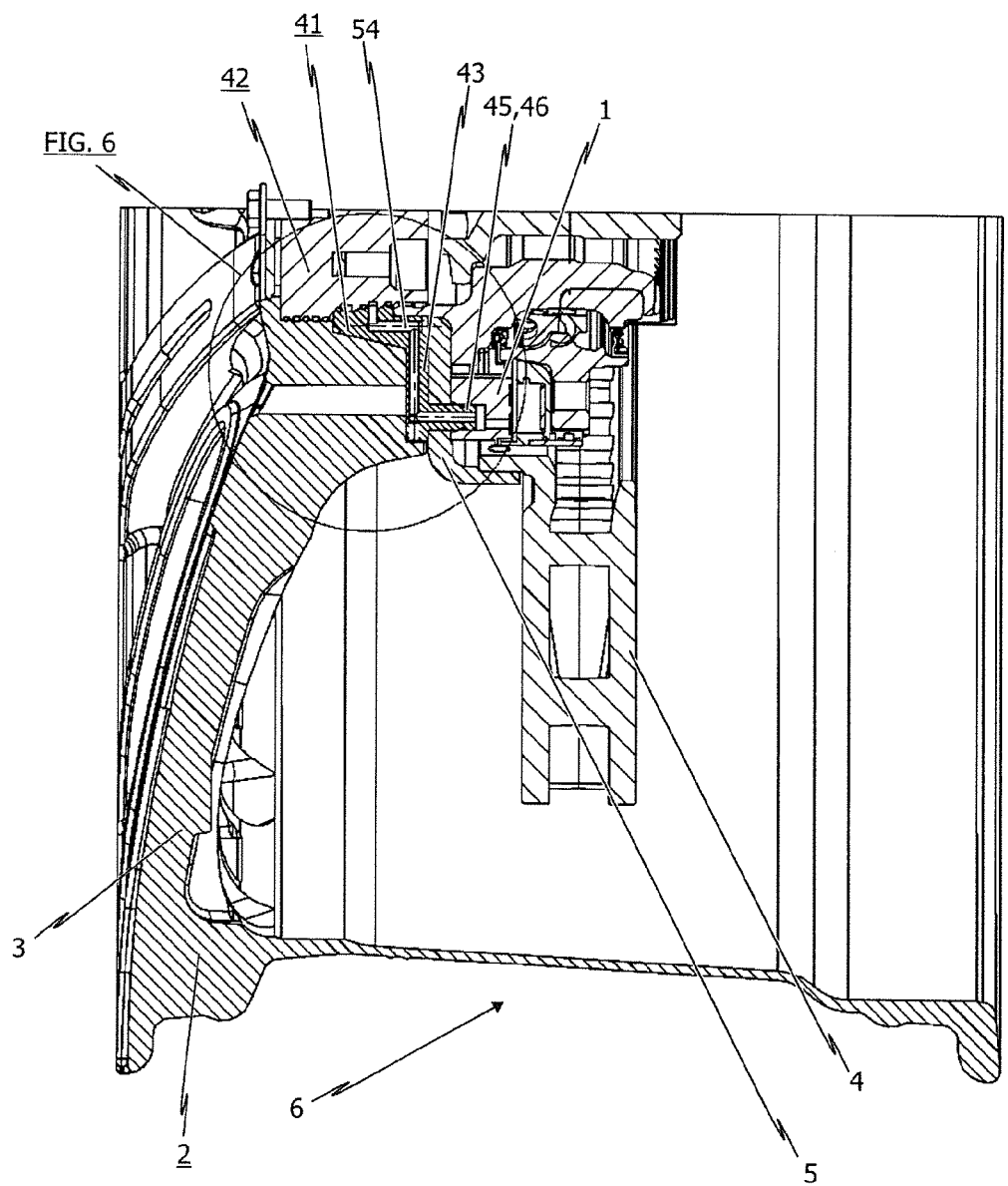
FIG. 5 is a schematic, longitudinal section through a region of the wheel unit according to FIG. 4.
Figure 6:
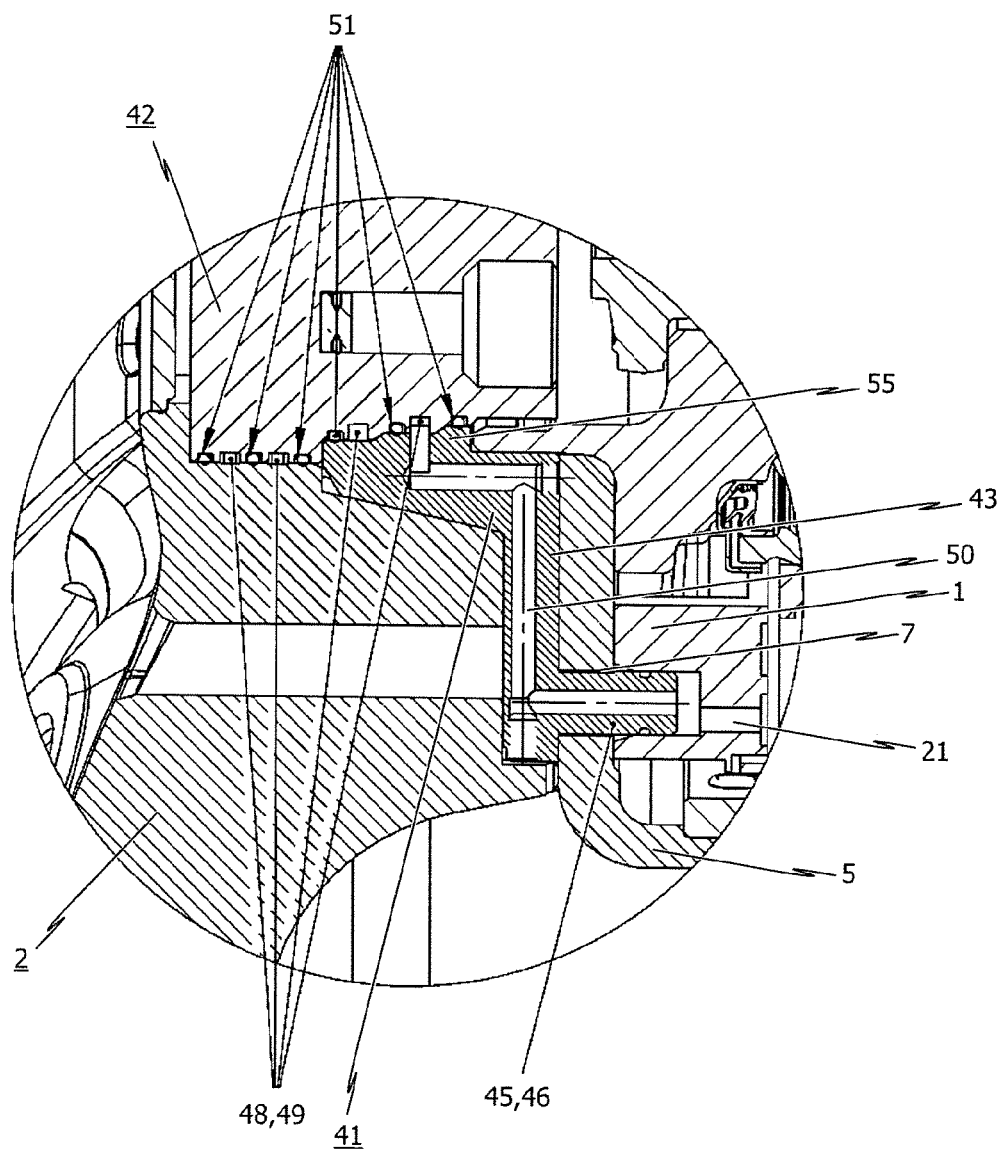
FIG. 6 is a schematic detailed view from FIG. 5.

With reference to the depiction in FIGS. 2 and 3 and with further reference to the depictions in FIGS. 4 to 6, a more detailed embodiment of a vehicle wheel is illustrated, which is provided with a system 40 for transmitting control pressures and/or working pressures.

In detail, FIG. 2 and FIG. 3 show an isometric depiction of an exemplary embodiment of the transmission system 40 according to the invention, each in a state in which the transmission system 40 is not connected to a wheel unit.

FIG. 4 schematically depicts a sectional view of the exemplary embodiment of the transmission system 40 according to the invention in a state in which this system 40, at least in some regions, is accommodated in a center hole (central bore) in a central region of a vehicle rim 2. FIG. 5 and FIG. 6 show details of this sectional view more closely.

FIG. 4 shows a rim 2 of a motor vehicle wheel that is mounted in rotary fashion by means of a wheel hub 1 via a wheel bearing onto parts, which are not shown in detail, of a wheel suspension according to the prior art. The rim 2 has multiple spokes 3 and in its middle, in a hub region of the wheel, at the outer edge of the wheel hub 1, a control valve, not shown, is positioned in a control valve housing that is connected to the wheel hub 1 in an airtight way. The rim 2, on which a tire that is not shown is mounted, is fastened next to a brake disc 4 by means of wheel lug bolts to the wheel hub 1 that supports the wheel bearing. In at least one spoke 3 of the rim 2, a last segment of a pressure medium supply line extends from a control valve line to a control valve housing and then to an air outlet from the rim 2 into the tire (not shown).

A target filling medium pressure in the tire is produced by means of a device for supplying compressed air, consisting of a compressed air supply line, not shown, from a compressed air source, not shown, that is mounted in the vehicle, through the wheel hub 1 and the rim 2, into the tire; the compressed air supply line contains a pneumatic control valve, not shown, in the control valve housing, which, as a function of a current tire pressure, can be brought into a switch position in the compressed air supply line for inflating the tire with air from the compressed air supply line and can also be brought into a switch position for letting air out of the tire. A check valve that automatically closes in the direction of the compressed air source can be built into the compressed air supply line and it can be prevented from automatically closing by a means for triggering it.

As already explained above, the vehicle rim 2 has, for example, multiple spokes 3, which connect the central region of the vehicle rim 2 to a tire support, which for example has a bed 6 and adjoining shoulders. A tire can be accommodated between the shoulders, facing the bed 6. The bed 6 is embodied as an outer circumferential surface of the rim 2.

As can be inferred from the depiction in FIG. 4, the vehicle rim 2 is detachably connected to a wheel hub 1 and between the wheel hub 1 and the vehicle rim 2, there is a brake-disc chamber 5 for a corresponding brake disc 4. The brake-disc chamber 5 has fastening bores 7 for the vehicle rim 2 and also has a central opening for the wheel hub 1 to extend through. The system 40 according to the invention for transmitting control pressures and/or working pressures is accommodated, at least in some regions, in this central opening of the brake-disc chamber 5, as can be seen from the sectional depiction in FIG. 4.

In detail, and as can be inferred from the isometric depictions in FIG. 2 and FIG. 3, the system 40 has a receiving part 41, which has a central region 55 with an opening and a total of five extension regions 43 that project radially, at least in some regions, from the central region 55. The receiving part 41 can be connected, preferably in a detachable way, to the wheel hub 1 by means of these radially projecting extension regions 43, or can be connected to the wheel hub 1 by means of the fastening bores 7 of the brake-disc chamber 5.

As is described in greater detail below, by means of at least some of the radially projecting extension regions 43, a transmission of control pressures and/or working pressures takes place from a pressure medium supply which is embodied, for example, in the form of a pressure medium rotary union 21 to the opening of the receiving part 41.

In the exemplary embodiment shown in the drawings, the system according to the invention 40 also has a rim insert 42, which is positioned in the central bore of the vehicle rim 2 and at least in some regions, can be accommodated in the opening of the central region 55.

According to the invention, the opening of the central region 55 and the rim insert 42, which, at least in some regions, is accommodated in the opening, together form a rotary union in order to [missing verb] control pressures and/or working pressures from the wheel-hub pressure medium supply, for example the pressure medium rotary union 21, to the rim insert 42 that is accommodated, at least in some regions, by the opening, regardless of a rotational position of the rim insert 42 relative to the opening or to the part 41 of the system 40 that is to be received.

For this purpose, as can be inferred from the exploded view according to FIG. 3, the opening of the central region 55, at least in some regions, is rotationally symmetrical and in particular circular-cylindrical or frustoconical and has an inner circumferential surface and in the inner circumferential surface, at least one annular groove or annular region 48 is provided, which preferably runs all the way around.

In any case, in the exemplary embodiment shown in the drawings, the rim insert 42, at least in some regions, is rotationally symmetrical and in particular circular-cylindrical or frustoconical and has an outer circumferential surface; in the outer circumferential surface, at least one annular groove (annular region 49) is provided, which preferably runs all the way around. The opening embodied in the inner circumferential surface and the at least one annular groove 48, 49 embodied in the outer circumferential surface of the rim insert 42 are embodied in such a way that in a state in which the rim insert 42 is accommodated, at least in some regions, by the opening of the central region 55, control pressures and/or working pressures can be transmitted from the hub pressure medium supply to the at least one annular groove 48, 49 by way of at least one radially projecting extension region.

Advantageously, corresponding seals 51 are provided in order to seal the at least one annular groove 48, 49.

The corresponding radially projecting extension regions 43 can be provided with corresponding bores 47, which correspond to the fastening bores 7 of the brake-disc chamber 5 for the vehicle rim 2 in order to thus connect the receiving part 41 of the transmission system to the wheel hub 1 or brake-disc chamber 5, preferably in a detachable way.

Furthermore, in at least some of the radially projecting extension regions 43, a respective pressure medium channel 54 is embodied, with a first end region that is in fluid connection with a pressure medium connection (pressure medium connection 45 for working pressure; pressure medium connection 46 for control pressure) of the corresponding extension region 43, and a second end region that opens out into the at least one annular groove 48, 49.

In the embodiment that is shown by way of example in the drawings, the pressure medium connection 45, 46 of the corresponding extension regions 43 is embodied as a plug-in connection and is designed to have the ability to be accommodated in a connection that is correspondingly embodied to be complementary to it and this connection corresponds to a fastening bore 7 in the brake-disc chamber 5. In detail, this connection extends through the brake-disc chamber 5, which is positioned, at least in some regions, between the wheel hub 1 and the vehicle rim 2 and opens out into a line system of the rotary union 21 that is in or can be brought into fluid connection with the wheel-hub pressure medium supply.

The system according to the invention 40 is designed as a component of a tire pressure control system and is embodied to transmit separate control pressures and/or working pressures from the wheel-hub pressure medium supply to the vehicle rim 2. The system 40 is also embodied to detect a tire pressure and/or tire temperature and to transmit the detected value or detected values to a corresponding control unit. The system 40 is also embodied to inflate or deflate, as needed, a tire (not shown in the drawings) that is mounted on the vehicle rim 2.

For this purpose, in the exemplary embodiment shown in the drawings, the rim insert 42 is provided with corresponding sensors 53 (pressure sensors/temperature sensors) and valves 52 (refill valve/pressure-controlled outlet valve).

According to embodiments of the receiving part 41 of the system according to the invention, this receiving part is provided with multiple integrated media lines and multiple annular grooves/annular channels 48, 49.

The receiving part 41 can be placed around the wheel hub 1 and/or the brake-disc chamber 5 or be permanently connected to the wheel hub 1 and/or the brake-disc chamber 5 or can be embodied as a part of these components. In the embodiment shown in the drawings, the receiving part 41 of the system according to the invention 40 has one or more connections respectively for recording or exporting control pressures and working pressures as well as the tire pressure.

The rim insert 42 is supported in the central bore of the vehicle rim 2 and is permanently connected to the vehicle rim 2 or is integrated directly into the rim 2 as a component thereof. Advantageously, the rim insert 42 has integrated annular channels for recording or exporting control pressures, working pressures, and the tire pressure and serving as a connection to other integrated functions.

The invention claimed is:

1. A system for transmitting control pressures and/or working pressures from a wheel-hub pressure medium rotary union of a wheel-hub pressure medium supply, to a vehicle rim mounted on a wheel hub, the system comprising:
   a receiving part, which includes a central region with a central opening and at least one extension region projecting radially from the central region, wherein the receiving part is connectable to the wheel hub by the at least one radially projecting extension region, in a detachable way; and
   a rim insert configured to attach to the vehicle rim and to record and/or export control pressures and/or working pressures, and which is accommodated by the central opening, and the control pressures and/or working pressures are transmittable from the wheel-hub pressure medium supply via the receiving part to the rim insert, wherein:
the opening of the central region has an inner circumferential surface including a first annular groove or annular region;
the rim insert has an outer circumferential surface including a second annular groove or annular region; and
when the rim insert is inserted into the opening the first annular grove or annular region is aligned with the second annular groove or annular region to transmit the control pressures and/or working pressures between the receiving part and the rim insert.

2. The system according to claim 1, wherein the opening of the central region receives at least a portion of the rim insert arranged in a central bore of the vehicle rim.

3. The system according to claim 2, wherein the rim insert has a configuration that is adapted to the central bore of the vehicle rim in such a way that the rim insert can be accommodated at least partially in the central bore of the vehicle rim.

4. The system according to claim 2, wherein the opening of the central region and the rim insert that is accommodated within the opening are connected in a rotary union for transmitting control pressures and/or working pressures from the wheel-hub pressure medium supply to the rim insert regardless of a rotational position of the rim insert relative to and within the opening.

5. The system according to claim 2, wherein the rim insert has an outer circumferential surface including at least one annular region that extends around and in a state that, when the rim insert is accommodated by the opening of the central region, the control pressures and/or working pressures can be transmitted from the hub pressure medium supply to the at least one annular region by way of the at least one radially projecting extension region.

6. The system according to claim 2, wherein the opening is rotationally symmetrical and has an inner circumferential surface; in the inner circumferential surface, at least one annular region is formed, which runs all the way around and is embodied in such a way that the control pressures and/or working pressures can be transmitted from the wheel-hub pressure medium supply to the at least one annular region by way of the at least one radially projecting extension region.

7. The system according to claim 2, wherein the rim insert includes at least one of:
(a) at least one pressure sensor that is in or can be brought into fluid connection with a tire mounted on the vehicle rim;
(b) the rim insert has at least one pressure-controlled outlet valve, which is in or can be brought into fluid connection with a tire mounted on the vehicle rim and is in or can be brought into fluid connection with the wheel-hub pressure medium supply by way of at least one annular region; or
(c) the rim insert has at least one refill valve that is in or can be brought into fluid connection with a tire mounted on the vehicle rim.

8. The system according to claim 5, wherein in the at least one radially projecting extension region, a pressure medium channel is formed, with a first end region, which is in fluid connection with a pressure medium connection of the extension region, and a second end region, which opens out into the at least one annular region.

9. A system for transmitting control pressures and/or working pressures from a wheel-hub pressure medium rotary union of a wheel-hub pressure medium supply, to a vehicle rim mounted on a wheel hub, the system comprising:
a receiving part, which includes a central region with a central opening and at least one extension region projecting radially from the central region, wherein the receiving part is connectable to the wheel hub by the at least one radially projecting extension region, in a detachable way;
a rim insert configured to attach to the vehicle rim and to record and/or export control pressures and/or working pressures, and which is accommodated by the central opening, and the control pressures and/or working pressures are transmittable from the wheel-hub pressure medium supply via the receiving part to the rim insert;
wherein the rim insert has an outer circumferential surface including at least one annular region that extends around and in a state that, when the rim insert is accommodated by the opening of the central region, control pressures and/or working pressures can be transmitted from the hub pressure medium supply to the at least one annular region by way of the at least one radially projecting extension region;
wherein the at least one radially projecting extension region includes a pressure medium channel with a first end region in fluid connection with a pressure medium connection of the extension region, and a second end region open toward the at least one annular region;
wherein the pressure medium connection of the at least one extension region is embodied as a plug-in connection and is designed to be accommodated in a counterpart connection through a brake-disc chamber that is positioned at least partially between the wheel hub and the vehicle rim and opens out into a line system that is in or can be brought into fluid connection with the wheel-hub pressure medium supply.

10. The system according to claim 1, further comprising a plurality of extension regions projecting radially from the central region and positioned equidistantly from one another; the extension regions are embodied for respectively engaging in a fastening bore of a circle of holes provided in a brake-disc chamber; and the fastening bores of the circle of holes of the brake-disc chamber are provided for the fastening of the vehicle rim.

11. The system according to claim 1, wherein the wheel-hub pressure medium supply has a decentralized integrated pressure-medium supply device or is in or can be brought into fluid connection with a central pressure-medium supply device by way of a pressure-medium rotary union.

12. The system according to claim 1, wherein the system is designed to be part of a tire pressure control system and is embodied to transmit separate control pressures and/or separate working pressures from the wheel-hub pressure medium supply to the vehicle rim.

13. The system according to claim 1, which is embodied to detect a tire pressure and/or tire temperature and to transmit the detected value or detected values to a control unit.

14. The system according to claim 1, which is embodied to inflate or deflate a tire that is mounted on the vehicle rim.

15. The system according to claim 1, wherein the pressure medium connection of the at least one extension region is embodied as a plug-in connection and is designed to be accommodated in a counterpart connection connected to the wheel hub and opens out into a line system that is in or can be brought into fluid connection with the wheel-hub pressure medium supply.

16. The system according to claim 15, wherein the counterpart connection is through a brake-disc chamber that is positioned at least partially between the wheel hub and the vehicle rim.

17. The system according to claim 1, further comprising a plurality of radially projecting extension regions projecting radially from the central region, and a pressure medium channel extending in at least one of the plurality of radially projecting extension regions and having a first end in fluid connection with the first annular groove or annular regions and an opposite second end including a pressure medium connection.

18. The system according to claim 1, wherein the rim insert rotates within the central opening.

19. A system for transmitting control pressures and/or working pressures from a wheel-hub pressure medium rotary union of a wheel-hub pressure medium supply, to a vehicle rim mounted on a wheel hub, the system comprising:

a receiving part, which includes a central region with a central opening and at least one extension region projecting radially from the central region, wherein the receiving part is connectable to the wheel hub by the at least one radially projecting extension region, in a detachable way; and a rim insert configured to attach to the vehicle rim and to record and/or export control pressures and/or working pressures, and which is accommodated by the central opening, and the control pressures and/or working pressures are transmittable from the wheel-hub pressure medium supply via the receiving part to the rim insert, wherein the opening of the central region receives at least a portion of the rim insert arranged in a central bore of the vehicle rim, and wherein the opening is rotationally symmetrical and has an inner circumferential surface; in the inner circumferential surface, at least one annular region is formed, which runs all the way around and is embodied in such a way that the control pressures and/or working pressures can be transmitted from the wheel-hub pressure medium supply to the at least one annular region by way of the at least one radially projecting extension region.

20. The system according to claim 19, wherein the rim insert rotates within the central opening.

* * * * *